(12) United States Patent
Kress (10) Patent No.: US 7,466,445 B2
(45) Date of Patent: Dec. 16, 2008

(54) COLOR AND DENSITY CALIBRATION OF COLOR PRINTERS

(75) Inventor: William C. Kress, Foothill Ranch, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 1011 days.

(21) Appl. No.: 10/619,387

(22) Filed: Jul. 14, 2003

(65) Prior Publication Data

US 2005/0012942 A1    Jan. 20, 2005

(51) Int. Cl.
*G06F 15/00* (2006.01)
*G03F 3/08* (2006.01)
*G06K 9/00* (2006.01)

(52) U.S. Cl. .................. 358/1.9; 358/518; 382/167

(58) Field of Classification Search ............... 358/1.9, 358/518, 520, 523, 530, 537, 538, 539, 442, 358/1.1, 2.1, 504; 382/167, 162
See application file for complete search history.

(56) References Cited

U.S. PATENT DOCUMENTS

| | | | | |
|---|---|---|---|---|
| 5,053,808 A | * | 10/1991 | Takagi | 355/38 |
| 5,121,198 A | | 6/1992 | Maronian | |
| 5,223,891 A | * | 6/1993 | Fierstein et al. | 355/77 |
| 5,689,582 A | * | 11/1997 | Murakami | 382/176 |
| 5,898,491 A | * | 4/1999 | Ishiguro et al. | 356/243.4 |
| 6,377,330 B1 | | 4/2002 | Vanderbrook et al. | |
| 6,381,036 B1 | * | 4/2002 | Olson | 358/1.9 |
| 6,535,307 B1 | * | 3/2003 | Allen et al. | 358/504 |
| 6,567,544 B1 | * | 5/2003 | Kanno et al. | 382/169 |
| 6,631,209 B1 | * | 10/2003 | Kanamori | 382/169 |
| 6,721,061 B1 | * | 4/2004 | Allen | 358/1.9 |
| 7,099,041 B1 | * | 8/2006 | Moriya et al. | 358/1.9 |
| 2004/0066538 A1 | * | 4/2004 | Rozzi | 358/2.1 |
| 2004/0136013 A1 | * | 7/2004 | Mestha et al. | 358/1.9 |
| 2008/0044082 A1 | * | 2/2008 | Muller | 382/162 |

FOREIGN PATENT DOCUMENTS

EP    1 199 881 A1    4/2002
JP    05219370 A  *  8/1993

* cited by examiner

*Primary Examiner*—Madeleine A Nguyen
(74) *Attorney, Agent, or Firm*—Tucker Ellis & West, LLP (57) ABSTRACT

A method for performing visual calibrations on a color printer. For calibrating relative intensities of colors, a predetermined image is printed by an image output apparatus. A user then selects a bias color and an intensity from a reference. The image output apparatus then adjusts its print engine based on the selection. For density calibration an image is printed, preferably once with a light background, and once with a dark background. The user then selects an adjustment after visually comparing the printed image with a reference image and adjusts the printer by noting whether details are missing from the printed image on the light background image or the dark background image.

18 Claims, 4 Drawing Sheets

COLOR AND DENSITY CALIBRATION OF COLOR PRINTERS

BACKGROUND OF THE INVENTION

The present invention is generally related to image output devices and more specifically related to color calibration and density calibration of color printers.

Image output apparatuses such as printers, faxes, copy machines, or multifunction peripherals which may include some or all of the aforementioned devices and even other types of image producing devices are used to produce images based on an input. Color image output devices typically produce color images by mixing together primary colors. If the color to be output matches one of the primary colors, then only that color is used. However, most colors require a combination of the primary colors. The image output device's engine determines an amount of the primary colors to mix.

A problem with color devices is that there can be variations in the output produced by the primary colors. The colors can become unbalanced creating relative differences between the primary colors, thus mixing the color causes unacceptable tints in the output image. The relative differences in colors can be caused by a variety of factors, including but not limited to, aging of various components, temperature and humidity changes, and changes between batches of inks used to create the image.

Although image output engines attempt to monitor and keep the relative densities of the color outputs the same, these methods are typically not 100% effective. Thus, the need exists for a method wherein a user can visually calibrate the image output device.

Another common and similar problem with image output apparatuses such as printers is balancing the lightness-darkness sum of marking channels. This can cause images produced by the apparatus to be too dark or too light and details in the image can be obscured.

Although image output engines attempt to monitor and keep the relative light-dark densities the same, these methods are typically not 100% effective. Thus, the need exists for a method wherein a user can visually calibrate the relative light-dark density of an image output device.

BRIEF SUMMARY OF THE INVENTION

In view of the aforementioned needs for color calibration, the present invention contemplates a method that uses a color sensitive image and provides a reference for a user to compare with the color sensitive image.

One aspect of the invention is for a method for visually calibrating a color printer, comprising the steps of providing an interface for receiving commands, providing a color reference, the reference comprising a plurality of colors, outputting a predetermined image, visually comparing the predetermined image with the reference, receiving a bias color selection, and adjusting the printer engine based on the received bias color. In addition to selecting a color, the reference may provide a plurality of intensities for each color. The interface may be a control panel interface on the image output device, or the interface can be implemented by a printer driver on a remote computer communicatively coupled to the color printer. When a printer driver is used on a remote computer, the color reference can be displayed on a monitor coupled to the remote computer. Other aspects of the present invention include an image output apparatus and a computer readable medium of instructions with means for implementing the aforementioned method.

In view of the aforementioned needs for light-dark density calibration, the present invention contemplates a method that uses an image that is sensitive to light-dark errors. The image contains important details in the highlight and shadow regions of usage, which when missing One aspect of the present invention is a method for determining that an image output device is in an acceptable density range, the image output device having an image output engine, comprising the steps of outputting a predetermined image, visually comparing the predetermined image with a reference, selecting an adjustment parameter; and adjusting the image output engine based on the adjustment parameter. Preferably the reference comprises a plurality of images, each image having a different background. Normally, an image is shown once with a dark background and again with a light background. By determining whether there are details missing, and from which background, a user can adjust the printer. When all of the details of the image are visible, then the printer has an optimal light-dark balance. An interface is used for commanding the image output device to print the predetermined image and to input the adjustment parameter. The interface may be either a control panel on the image output device, or a printer driver running on a remote computer communicatively coupled to the image output device. Normally, the adjustment parameter is selected from the group consisting of lighten, darken and no adjustment. It is further contemplated that the reference or the adjustment parameters can be a group with various shades of lightness or darkness.

Other aspects of the present invention include an image output apparatus and a computer readable medium of instructions with means for implementing the aforementioned method.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention. In the drawings.

DETAILED DESCRIPTION OF INVENTION

Throughout this description, the preferred embodiment and examples shown should be considered as exemplars, rather than limitations, of the present invention.

One aspect of the present invention is for a method of performing visual calibration for balancing the colors of a color printer. The method comprises printing a composite that is very sensitive to relative intensities of the color channels used by the printer, which are normally cyan, magenta, yellow. A user compares the composite to a reference image and looks for any tints or hues on the composite that are abnormal to the reference image. The user then inputs a bias color to indicate the color that appears on the composite. The image output apparatus then performs internal adjustments based on the input bias color.

Figure 1:
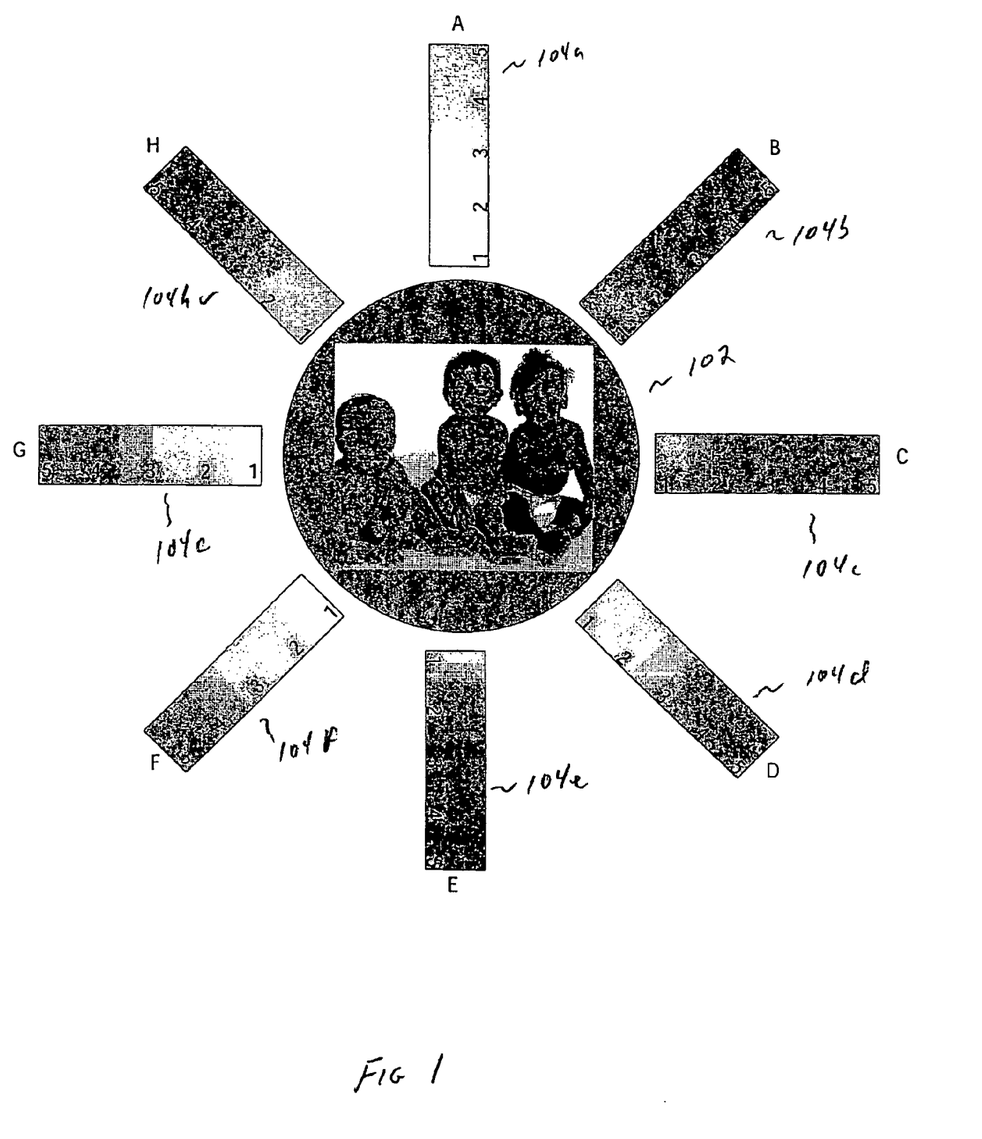
FIG. 1 is an illustration showing an example reference image for use with color calibration along with bias colors and intensities.

Referring to FIG. 1 there is shown an example reference image 102 and bias color bars A 104a, B 104b, C 104c, D 104d, E 104e, F 104f, H 104g and G 104h. As shown in FIG. 1, color bar A 104a is yellow, color bar B 104b is orange, color bar C 104c is red, color bar D 104d is magenta, color bar E 104e is violet, color bar F 104f is blue, color bar G 104g is blue-green and color bar H 104h is green. As shown in FIG. 1, each of the aforementioned color bars has various intensities, numbered 1-5 where 5 represents the darkest intensity for the color and 1 the lightest.

Figure 2:
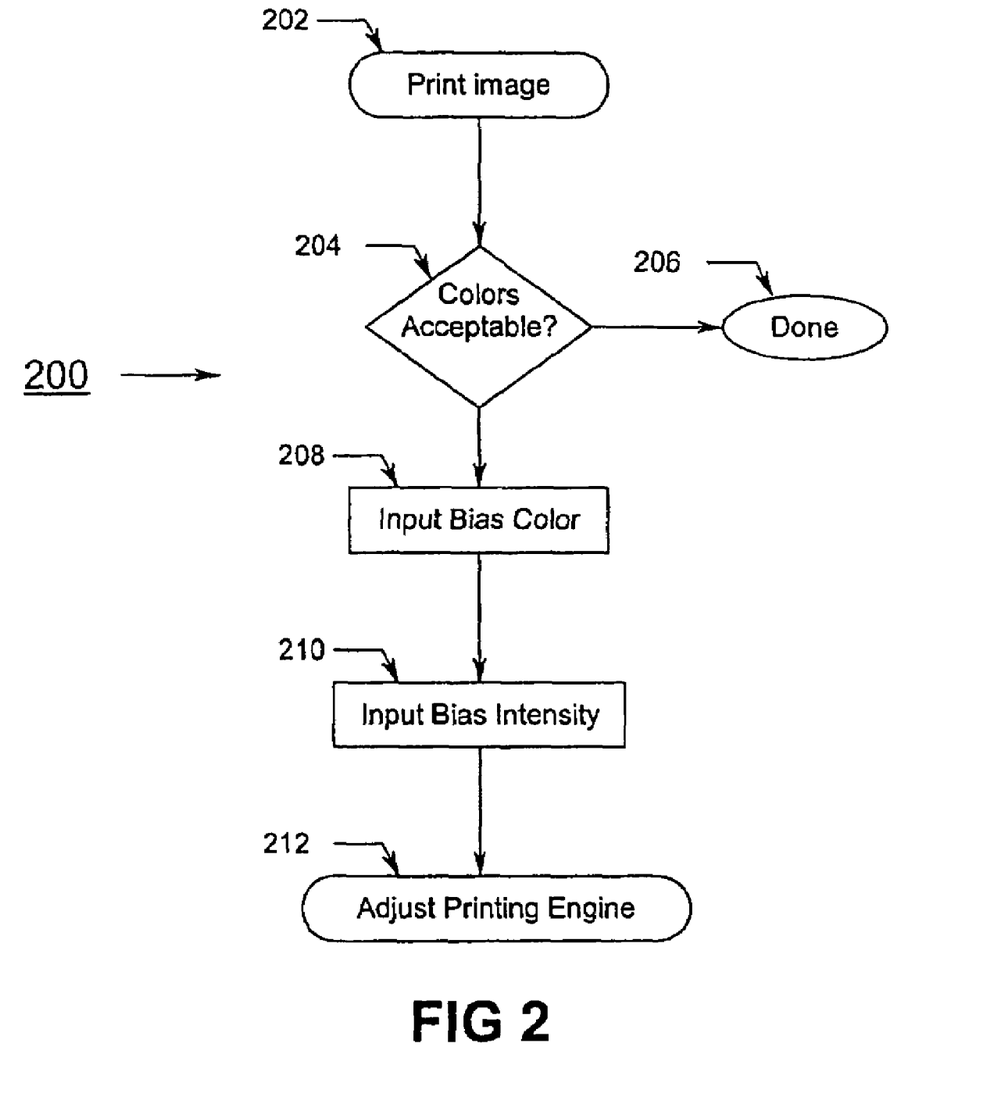
FIG. 2 is a block diagram of steps contemplated by a preferred embodiment of the present invention.

Referring now to FIG. 2 with continued reference to FIG. 1, there is illustrated a method 200 of the preferred embodiment. The method begins at step 202 by printing a predetermined image (not shown), which should match the reference image 102. Preferably, the image is sensitive to relative intensities of the color channels used by the printer, normally cyan, magenta and yellow. The predetermined image is then visually compared to the reference image 102 as shown in step 204. If the user notices a tint or hue on the predetermined image, the user then selects a bias color, and intensity to match the tint or hue observed on the predetermined image. The user then inputs the bias color as shown in step 208 and intensity as shown in step 210 into the image output apparatus which then, as shown in step 212, adjusts its print engine accordingly. Using the example of FIG. 1, if the user notices a medium magenta tint in the predetermined image, the user would select color bar D 104d, intensity level 3. It is also possible that more than one adjustment may be needed, therefore the process may be repeated as often as necessary.

Figure 3:
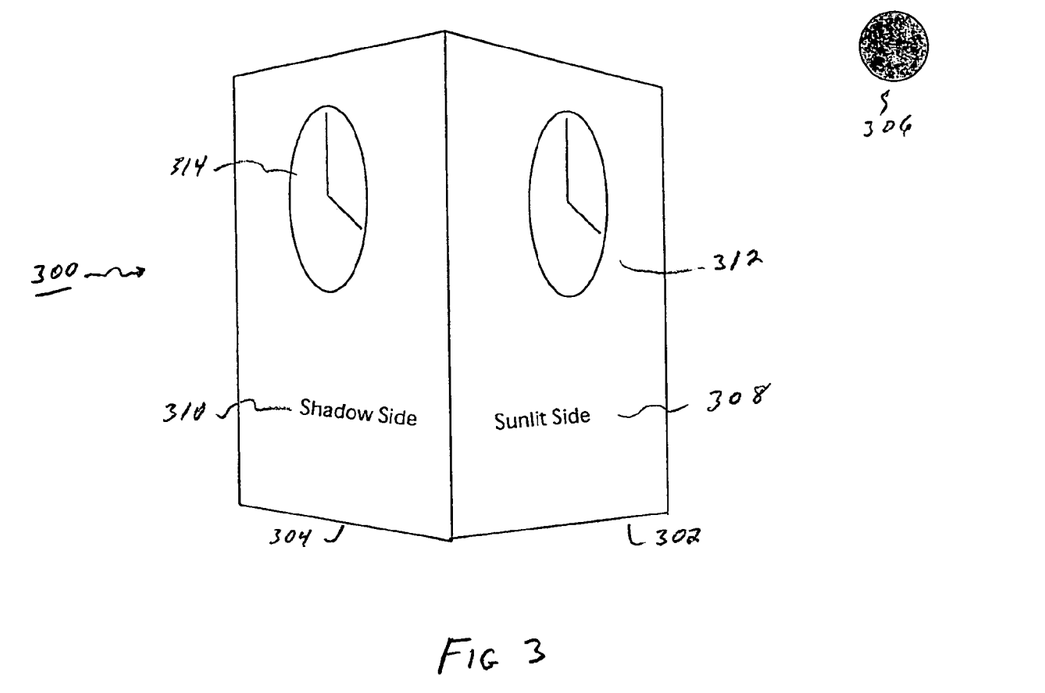
FIG. 3 is an illustration showing an example reference image for lightness-darkness density calibration.
Figure 4:
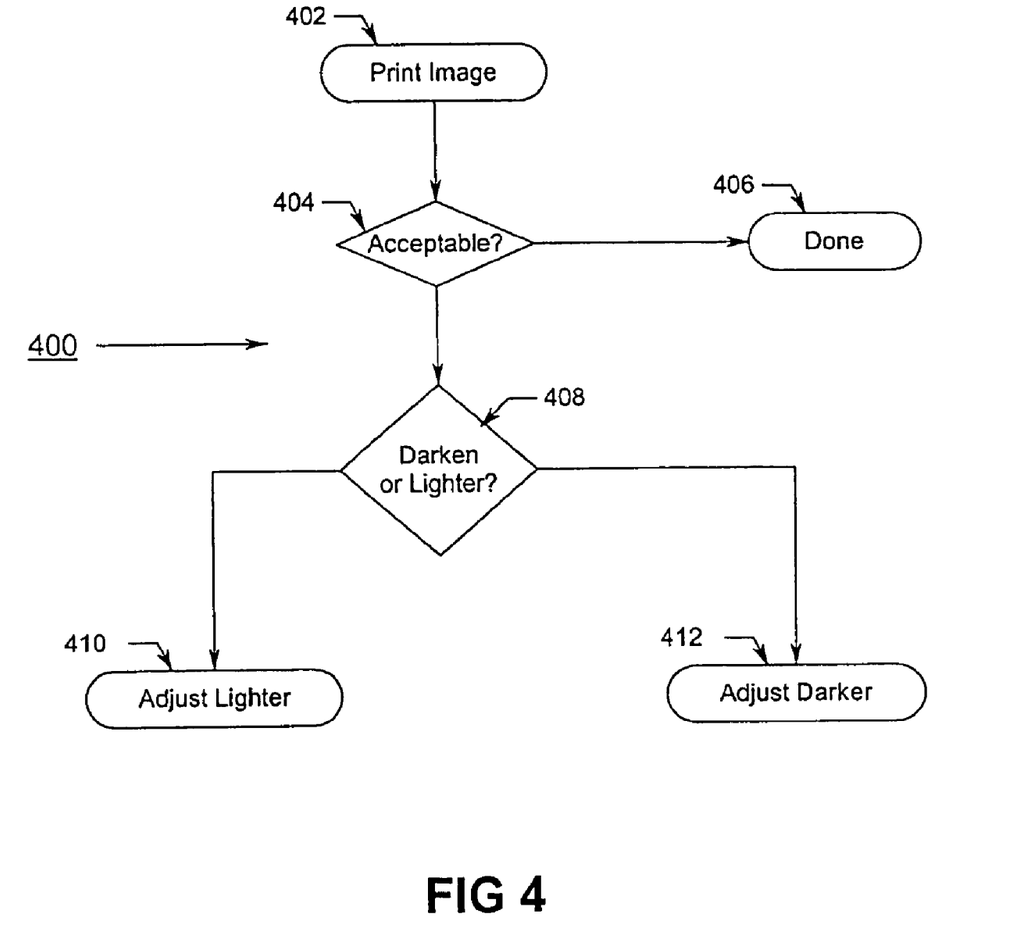
FIG. 4 is a block diagram of steps contemplated by a method of the preferred embodiment of the present invention for lightness-darkness density calibration.

Referring now to FIGS. 3 and 4 there is shown a reference 300 and method 400 for light-dark calibration of a color printer. As shown in FIG. 3, the reference 300 comprises a sunlit side 302 and a shadow side 304. A sun icon 306 can be used to indicate which side is the sunlit side 302. The sides may also be labeled such as Sunlit Side 308 and Shadow Side 310. As shown in FIG. 3, the image comprises a circle with two lines 312 similar to a clock at the 4 o'clock position on the sunlit side 302, and another circle with two lines 314 on the shadow side 304. The reference 300 should be an image that is sensitive to light-dark errors. Important details, such as the circles 312 and 314, are in the sunlit side 302 and shadow side 304. The user by comparing a print out from an image apparatus with the reference 300 can determine if detail is missing, and from which side.

The reference in FIG. 3 shows the ideal output. However, it is also contemplated that the reference 300 may also have several other images with details missing on either the sunlit side 302 or the shadow side 304 so that the user can select a drawing most resembling the output for faster adjustments.

The method 400 begins at step 402 by printing an image from the image output device. At step 404 the user compares the image with the reference 300. If the image is acceptable then the process is done as shown in step 406. Otherwise, processing continues to step 408 where the user determines if the image is lighter or darker than the reference 300. If the image is lighter then as shown at step 410 the image output device is adjusted lighter, if the image is darker that the reference 300 then the image output device is adjusted darker as shown in step 412. The process may be repeated as often as necessary.

Both the aforementioned color calibration method 200 and light-dark density calibration method 400 can be performed either at the control panel of the image output device or by using a printer driver on a remote computer communicatively coupled to the output device. When using a printer driver, the desired reference image may be displayed on a video monitor coupled to the remote computer. The commands to print an image would be sent and inputting of the adjustment parameters may be also be performed either at the control panel or via the printer driver. Once the appropriate bias or intensity adjustment is made, then the image output apparatus uses the adjustment parameters to adjust the output of the device.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A method for color balancing an image output device having an image output engine, comprising the steps of:
    receiving electronic document data encoded in a multidimensional component color space, the electronic document data defining an image comprising,
        a centralized image portion, including a plurality of color components and having colorization highly sensitive to variations to relative intensities of component values,
        a plurality of selectable color regions extending generally radially from the centralized image portion, wherein each color region corresponds to a bias color associated with the centralized image portion, and
        a plurality of selectable bias values associated with varying intensities associated with each color region, wherein bias values are reflected as being graduated relative to an associated color region and a radial distance from the centralized image portion;
    outputting a color image in accordance with the electronic document data;
    visually comparing the color image with a reference;
    receiving an adjustment parameter in accordance with at least one selected color region and associated bias value selected after the step of visually comparing; and
    adjusting image output engine colorization parameters based on the adjustment parameter.

2. The method of claim 1 wherein the reference comprises a plurality of images, each image having a different background.

3. The method of claim 2 wherein the plurality of images has one image with a light background.

4. The method of claim 3 wherein the plurality of images has one image with a dark background.

5. The method of claim 4 wherein the image with a light background is the same image as the image with the dark background.

6. The method of claim 4 wherein the color image comprises a first image outputted with a light background and a first image with a dark background.

7. The method of claim 6 further comprising the step of visually comparing the color image with the reference by determining whether any details are missing from the first image with a light background and the first image with a dark background.

8. The method of claim 2 wherein commands for performing the method are input via a control panel interface on the image output device.

9. The method of claim 2 wherein the commands for performing the method are input via a remote computer communicatively coupled to the image output device.

10. The method of claim 2 wherein the adjustment parameter is selected from the group consisting of lighten, darken, and no adjustment.

11. An image output apparatus for color balancing an image output device having an image output engine, comprising:

means adapted for receiving electronic document data encoded in a multidimensional component color space, the electronic document data defining an image comprising,
a centralized image portion, including a plurality of color components and having colorization highly sensitive to variations to relative intensities of component values,
a plurality of selectable color regions extending generally radially from the centralized image portion, wherein each color region corresponds to a bias color associated with the centralized image portion, and
a plurality of selectable bias values associated with varying intensities associated with each color region, wherein bias values are reflected as being graduated relative to an associated color region and a radial distance from the centralized image portion;

means adapted for outputting a color image in accordance with the electronic document data;

means adapted for visually comparing the color image with a reference;

means adapted for receiving an adjustment parameter in accordance with at least one selected color region and associated bias value based on an output of the means adapted for visually comparing; and means adapted for adjusting image output engine colorization parameters based on the adjustment parameter.

12. The image output apparatus of claim 11 wherein the reference image comprising a plurality of images, each image having a different background.

13. The image output apparatus of claim 12 wherein the plurality of images has one image with a light background.

14. The image output apparatus of claim 13 wherein the plurality of images has one image with a dark background.

15. The image output apparatus of claim 14 wherein the image with a light background is the same image as the image with the dark background.

16. The image output apparatus of claim 15 wherein the color image comprises a first image outputted with a light background and a first image with a dark background.

17. The image output apparatus of claim 11 further comprising an interface wherein commands are input via a control panel interface.

18. The image output apparatus of claim 11 wherein the adjustment parameter is selected from the group consisting of lighten, darken and no adjustment.

* * * * *

UNITED STATES PATENT AND TRADEMARK OFFICE
CERTIFICATE OF CORRECTION

PATENT NO. : 7,466,445 B2  Page 1 of 4
APPLICATION NO. : 10/619387
DATED : December 16, 2008
INVENTOR(S) : Kress It is certified that error appears in the above-identified patent and that said Letters Patent is hereby corrected as shown below:

The title page, showing an illustrative figure, should be deleted and substitute therefor the attached title page.

In the Drawings:
Replace Fig. 1 with the following:

FIG. 1

Replace Fig. 2 with the following:

FIG. 2

Replace Fig. 3 with the following:

FIG. 3

Replace Fig. 4 with the following:

FIG. 4

Signed and Sealed this

Fifth Day of January, 2010

David J. Kappos
*Director of the United States Patent and Trademark Office*

(12) United States Patent
Kress (10) Patent No.: US 7,466,445 B2
(45) Date of Patent: Dec. 16, 2008

(54) COLOR AND DENSITY CALIBRATION OF COLOR PRINTERS

(75) Inventor: William C. Kress, Foothill Ranch, CA (US)

(73) Assignees: Toshiba Corporation (JP); Toshiba Tec Kabushiki Kaisha (JP)

(*) Notice: Subject to any disclaimer, the term of this patent is extended or adjusted under 35 U.S.C. 154(b) by 1011 days.

(21) Appl. No.: 10/619,387

(22) Filed: Jul. 14, 2003

(65) Prior Publication Data
US 2005/0012942 A1 Jan. 20, 2005

(51) Int. Cl.
G06F 15/00 (2006.01)
G03F 3/08 (2006.01)
G06K 9/00 (2006.01)

(52) U.S. Cl. .............. 358/1.9; 358/518; 382/167

(58) Field of Classification Search ............ 358/1.9, 358/518, 520, 523, 530, 537, 538, 539, 442, 358/1.1, 2.1, 504; 382/167, 162
See application file for complete search history.

(56) References Cited

U.S. PATENT DOCUMENTS

| | | | |
|---|---|---|---|
| 5,053,808 A * | 10/1991 | Takagi | 355/38 |
| 5,121,198 A | 6/1992 | Maronian | |
| 5,223,891 A * | 6/1993 | Fierstein et al. | 355/77 |
| 5,689,582 A * | 11/1997 | Murakami | 382/176 |
| 5,898,491 A * | 4/1999 | Ishiguro et al. | 356/243.4 |
| 6,377,330 B1 | 4/2002 | Vanderbrook et al. | |
| 6,381,036 B1 * | 4/2002 | Olson | 358/1.9 |
| 6,535,307 B1 * | 3/2003 | Allen et al. | 358/504 |
| 6,567,544 B1 * | 5/2003 | Kanno et al. | 382/169 |
| 6,631,209 B1 * | 10/2003 | Kanamori | 382/169 |
| 6,721,061 B1 * | 4/2004 | Allen | 358/1.9 |
| 7,099,041 B1 * | 8/2006 | Moriya et al. | 358/1.9 |
| 2004/0066538 A1 * | 4/2004 | Rozzi | 358/2.1 |
| 2004/0136013 A1 * | 7/2004 | Mestha et al. | 358/1.9 |
| 2008/0044082 A1 * | 2/2008 | Muller | 382/162 |

FOREIGN PATENT DOCUMENTS

| | | | |
|---|---|---|---|
| EP | 1 199 881 A1 | 4/2002 | |
| JP | 05219370 A * | 8/1993 | |

* cited by examiner

Primary Examiner—Madeleine A Nguyen
(74) Attorney, Agent, or Firm—Tucker Ellis & West, LLP (57) ABSTRACT

A method for performing visual calibrations on a color printer. For calibrating relative intensities of colors, a predetermined image is printed by an image output apparatus. A user then selects a bias color and an intensity from a reference. The image output apparatus then adjusts its print engine based on the selection. For density calibration an image is printed, preferably once with a light background, and once with a dark background. The user then selects an adjustment after visually comparing the printed image with a reference image and adjusts the printer by noting whether details are missing from the printed image on the light background image or the dark background image.

18 Claims, 4 Drawing Sheets